Feb. 18, 1941.  M. W. FARLOW  2,232,059
CHEMICAL PROCESS
Filed Sept. 29, 1938
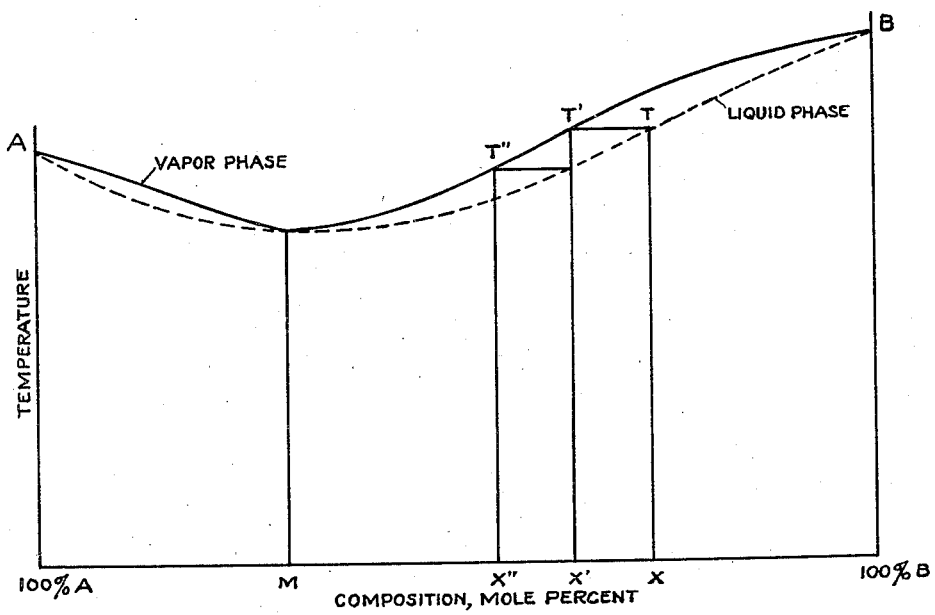
MARK W. FARLOW  INVENTOR
BY
George W. Walker ATTORNEY Patented Feb. 18, 1941

2,232,059

UNITED STATES PATENT OFFICE 2,232,059

CHEMICAL PROCESS

Mark W. Farlow, Wilmington, Del., assignor to E. I. du Pont de Nemours and Company, Wilmington, Del., a corporation of Delaware Application September 29, 1938, Serial No. 232,313

14 Claims. (Cl. 202—42)

This invention relates to a process of separating hexamethylenediamine from hexamethyleneimine. This invention furthermore relates to the separation of hexamethyleneimine from water.

In the copending application of Benjamin W. Howk, Serial No. 127,203, filed February 23, 1937, there is disclosed a process for the production of hexamethylenediamine by the catalytic hydrogenation of adiponitrile. In the production of this product by this process, hexamethyleneimine is formed. In distilling mixtures of hexamethyleneimine and hexamethylenediamine there is first obtained a pure fraction of hexamethyleneimine boiling at 138° C. and then a large intermediate cut containing a mixture of imine and diamine. To stop the separation after one distillation would result in the loss of this large intermediate cut and therefore a loss in the amount of the pure products obtained. This large middle fraction of intermediate cut must necessarily be redistilled several times to obtain an effective separation of the imine from the diamine. The imine boils at a temperature of 138° C. at 760 mm. pressure and the diamine has a boiling range of 90° to 92° C. at 14 mm. pressure. It furthermore has been found necessary in order to recover pure diamine to carry out distillation under vacuum conditions in order to avoid loss of diamine through polymerization, decomposition, etc. By the use of the present invention vacuum fractional distillation is avoided.

It is the object of this invention to separate hexamethylenediamine from hexamethyleneimine by a relatively simple and practical procedure. A further object of the invention is the separation of hexamethyleneimine from admixture with liquids other than water. A still further object of this invention is to separate hexamethyleneimine by a novel method from at least one other catalytic hydrogenation product of adiponitrile. Still another object is to provide a practical process for the separation of hexamethyleneimine from water. Other objects will be apparent from a reading of the description of this invention.

These objects are accomplished by the following process steps taken separately or combined, which comprise creating a mixture of at least one substance, preferably hexamethylenediamine, together with hexamethyleneimine and water, distilling said mixture, removing an azeotropic mixture of hexamethyleneimine and water, recovering said azeotropic mixture, and heating said mixture at an elevated temperature, but below its boiling point, until it separates in two layers, separating the upper layer which is rich in hexamethyleneimine, and distilling said separated layer, thereby recovering a substantial amount of the pure hexamethyleneimine.

The hexamethyleneimine-water mixtures of this invention belong to the class commonly referred to as binary mixtures having a minimum boiling point. By this is meant that the boiling point of the binary mixture at a given pressure is lower than the boiling point of either of the components of the mixture. Mixtures of this type are characterized by the fact that on distillation of solutions containing an excess of one component, both components cannot be separated in the pure state. There is obtained instead a fraction comprising the component that is present in excess together with the binary. This fact may be best illustrated by reference to the drawing. The drawing is a typical temperature composition diagram, which represents the behavior of all binary mixtures coming within the classification of the binary mixture discovered and claimed herein.

Referring to the diagram, the point M on the horizontal axis represents the composition of the constant boiling binary mixture. The points A and B on the vertical axis represent the boiling points of the pure components. The solid and dotted lines represent, respectively, experimentally determined temperature-composition curves of vapor and liquid phases respectively. The portion of the diagram to the right of the ordinate at M is concerned with mixtures rich in component B, and the portion to the left with mixtures rich in component A. The practical significance of diagrams of this type is illustrated as follows: A mixture rich in B having the composition X will boil at a temperature determined by the intersection of the vertical line XT with the lower dotted temperature-composition curve. At this boiling point the composition of the vapor coming off at the same temperature is determined by the intersection of the ordinate of point T' on the vapor composition curve with the horizontal axis at X'. In other words, X' represents the composition of the distillate obtained on distilling a liquid of composition X. By the same procedure on redistilling the mixture of composition X', a distillate of composition X'' is obtained. By repeating this process for a suitable number of times, there is finally obtained a pure binary mixture having the composition M, which undergoes no further change in composition upon repeated distillation under the same pressure. From a practical point of view, the same thing is accomplished by using a very efficient fractionating column, and a mixture of composition X can be separated in one step into pure binary and pure component B. By a similar procedure, mixtures rich in A can be separated into pure component A and the binary mixture M.

This invention may be best illustrated by the following examples, which are not to be construed as limiting the invention in any way.

Example I

Eighty-eight grams of carefully purified hexamethyleneimine, boiling point 138° C./760 mm., is mixed with 39.0 grams of pure water to form a solution that consists of a single liquid phase at room temperature. This solution is subjected to fractional distillation at a pressure of 760 mm. in a precision fractionating still equipped with a refluxing still head, liquid phase take-off, and reflux measuring device. The initial boiling point at the head of the column, as determined by boiling vigorously under total reflux, is 95.5° C., and thereafter while operating under a reflux ratio of approximately 10:1, there is obtained 74.0 grams of a fraction boiling constantly at the same temperature, 95.5° C. A second fraction of 5.9 grams is collected while the temperature rises from 95.5° to 138° C., and a third fraction of 44.5 grams passes over at a constant temperature of 138° C. Fraction 1 comprises a hexamethyleneimine-water binary having the following properties: Neutral equivalent, 195.8; $N_D^{25}$, 1.4124; specific gravity $\frac{25}{25}$, 0.9567

The analysis of this binary corresponds to a composition containing 50.58% by weight of hexamethyleneimine and 49.42% of water. Fraction 2 is an intermediate fraction, and fraction 3 consists of pure hexamethyleneimine as evidenced by comparison of the physical properties of this fraction with those of an authentic sample of hexamethyleneimine. This experiment is an illustration of the separation of a constant boiling binary from a solution rich in hexamethyleneimine.

Example II

One hundred fifty grams of a solution containing 50 grams of pure hexamethyleneimine and 100 grams of pure water is fractionally distilled under a pressure of 760 mm. according to the procedure described in Example I. These is obtained 94.9 grams of hexamethyleneimine-water binary, boiling point 95.5° C., 3.8 grams of an intermediate fraction, boiling point 95.5° to 100° C., and 48.7 grams of pure water, boiling point 100° C. The binary obtained in this experiment is identical as regards composition and physical properties with that described in Example I.

Example III

A solution of hexamethyleneimine and water is made up to contain 49.42 parts by weight of water and 50.58 parts of hexamethyleneimine in accordance with the composition of the binary mixture described in Examples I and II. One hundred fifty grams of this solution is distilled in an efficient fractionating still under a pressure of 760 mm., and the distillate is collected in ten approximately equal fractions. Throughout the entire course of the distillation the boiling point remains constant at 95.5° C. Analysis of each of the individual fractions of distillate shows them to be identical in composition, neutral equivalent 195.8. Moreover, the analytical values and physical properties of each distillate fraction correspond very closely to those of the original solution and to those of the binary mixture described in Examples I and II.

Example IV

One hundred grams of pure adiponitrile is hydrogenated in a steel high-pressure autoclave in the presence of 75 grams of liquid ammonia and 10 grams of an active nickel catalyst under a pressure of 1500 to 2500 lbs./sq. in. at a temperature of 130° C. When the absorption of hydrogen stops, indicating that the reaction is complete, the autoclave is cooled and the product rinsed out with 50 cc. of water. The aqueous solution is filtered to remove the catalyst, which is washed with an additional 25 cc. of water. The combined filtrate and washings are transferred to a precision fractionating still and separated into the following fractions: (1) ammonia, which comes off rapidly when the solution is warmed slightly above room temperature, (2) 16.3 grams of a product, boiling point 95.5°/760 mm., (3) 65 grams of water, boiling point 100° C., and (4) 96.1 grams of hexamethylenediamine, boiling point 104° to 105° C./27 mm., melting point 40° to 41° C. The fraction, boiling point 95.5° C./760 mm. has the following constants:

$N_D^{25}$, 1.4124; specific gravity $\frac{25}{25}$, 0.9567 neutral equivalent 195.8. This product is the same hexamethyleneimine-water binary described above, and the amount obtained corresponds to an 8.24 gram yield of hexamethyleneimine. The conversions to hexamethyleneimine and hexamethylenediamine obtained are, respectively, 9.0 and 89.5% of theory.

Example V

A binary mixture of hexamethyleneimine and water containing 50.58 parts by weight of imine is heated to a temperature of between 80° and 90° C., whereupon it separates into two layers, an upper layer rich in hexamethyleneimine and the lower water layer. The upper layer is separated and subjected to fractional distillation at a pressure of 760 mm. There is obtained first a fraction, boiling point 95.5°, which is identical in composition with the original binary mixture; thereafter there is obtained pure hexamethyleneimine, boiling point 138°. On repeating this process using in each instance the recovered binary mixture, substantially all the hexamethyleneimine is recovered in a pure state.

Although in the foregoing examples I have described a hexamethyleneimine-water binary of fixed composition and boiling point at 760 mm. pressure, it is to be understood that the relative proportions of imine and water in the binary may vary somewhat depending upon the pressure at which the distillation is carried out. This is a common and well-known property of all binary mixtures coming within this general classification.

In addition to the mixtures disclosed in the examples, hexamethylenediamine may be separated from admixture with other substances such as the various products, taken separately or combined, obtained by the catalytic hydrogenation of adiponitrile, as well as other substances such as methanol. This separation of course is accompanied by distilling off hexamethyleneimine-water binary azeotropic mixture. The water may be added in sufficient quantity to remove the imine if it is not already present in such quantity. It is also possible where it is desirable to remove but a part of the imine to add that amount of water which will be sufficient to cause the formation of a binary azeotropic mixture of an amount that when removed by distillation will carry with it the amount of the imine desired to be removed.

The separation of hexamethyleneimine from the diamine may be greatly facilitated by the addition of water in sufficient amounts to form the binary, which boils at a temperature more than 40° below that of pure hexamethyleneimine. A further advantage of this process is that by using an excess of water over and above the amount required for binary formation, all of the imine can be removed from the mixture by distillation under atmospheric pressure without incurring the losses that necessarily result from distillation of the same mixtures under reduced pressures.

While pure hexamethyleneimine, boiling point 138° C., may be recovered from the binary mixtures of this invention according to any of the well-known methods for separating water-imine mixtures into their component parts (e. g., the binaries may be treated with solid caustic potash or soda to separate a layer of substantially pure imine, which is then dried over solid caustic soda and refined by distillation), Example V furnishes an illustration of a novel method for accomplishing this separation. This method depends on the unusual solubility behavior of hexamethyleneimine in water. Although it is miscible in all proportions at room temperature, it becomes less soluble with increasing temperatures. For example, on heating a 50.58% imine-water binary to a temperature of about 90° C., it separates into two layers, an upper layer very rich in hexamethyleneimine and a lower water layer. Distillation of the upper layer yields some binary together with pure hexamethyleneimine as shown in Example V, and on repeating the process with recovered binary a fair separation can be effected.

This invention is valuable in connection with the recovery of pure hexamethyleneimine from complex mixtures. Pure hexamethyleneimine is a valuable product having many important industrial uses.

It is apparent that many widely different embodiments of this invention may be made without departing from the spirit and scope thereof and therefore it is not intended to be limited except as indicated in the appended claims.

I claim:

1. A process for the separation of hexamethyleneimine from hexamethylenediamine and other products formed in the hydrogenation of adiponitrile which comprises creating a mixture containing hexamethyleneimine, water, and hexamethylenediamine and said other products formed in the hydrogenation of adiponitrile, distilling said mixture, and recovering as a product of distillation an azeotropic mixture of water and hexamethyleneimine, bringing said azeotropic mixture to a temperature below its boiling point but sufficiently elevated to cause a separation of said azeotropic mixture into two layers, separating the upper layer, and distilling said separated upper layer thereby recovering as a distillate a second azeotropic mixture while leaving as a residue hexamethyleneimine.

2. The process in accordance with claim 1 characterized in that the second azeotropic mixture is subjected to the steps of layer separation followed by distillation of the upper layer for further recovery of hexamethyleneimine.

3. A process for the separation of hexamethyleneimine from hexamethylenediamine and other products resulting from the catalytic hydrogenation of adiponitrile which comprises creating a mixture of said compounds with water, distilling said mixture and recovering an azeotropic mixture of hexamethyleneimine and water, bringing said azeotropic mixture to a temperature below its boiling point but sufficiently elevated to cause a separation of said azeotropic mixture into two layers, separating the upper layer, and distilling said separated upper layer thereby recovering as a distillate a second azeotropic mixture while leaving as a residue hexamethyleneimine.

4. In a process for the separation of hexamethyleneimine from hexamethylenediamine and other products formed in the hydrogenation of adiponitrile, the step of creating a mixture containing hexamethyleneimine, water, and hexamethylenediamine and said other products formed in the hydrogenation of adiponitrile, and distilling said mixture thereby recovering an azeotrope of water and hexamethyleneimine.

5. A process for the separation of hexamethyleneimine from at least one other substance produced by the catalytic hydrogenation of adiponitrile which comprises creating a mixture of said imine and other substance with water, said water being present in an amount in excess of the amount of imine present, distilling said mixture and thereby recovering the imine as a azeotrope with water.

6. In the process of purifying hexamethylenediamine containing hexamethyleneimine, the improvement which comprises distilling said mixture while admixed with water in a quantity in excess of that sufficient to form an azeotrope with the hexamethyleneimine under the distillation conditions, and then distilling the resulting hexamethylenediamine-water mixture under vacuum conditions to remove the water therefrom.

7. The process in accordance with claim 6 characterized in that the first distillation step is carried out at substantially atmospheric pressure.

8. In the process of purifying hexamethylenediamine containing hexamethyleneimine, the improvement which comprises distilling said mixture while admixed with water in a quantity in excess of that sufficient to form an azeotrope with the hexamethyleneimine under the distillation conditions.

9. A process for the separation of hexamethyleneimine from admixture with water which comprises distilling said mixture and recovering therefrom a fraction comprising an azeotropic mixture of said imine and water, bringing said azeotropic mixture to a temperature below its boiling point but sufficient to cause a separation of said mixture into two layers, separating the upper layer and distilling said layer, thereby recovering as a distillate a second azeotropic mixture of water and imine while leaving as a residue hexamethyleneimine.

10. The process in accordance with claim 9 characterized in that the second azeotropic mixture is subjected to the step of layer separation and distillation of the upper layer for the purpose of recovering a further amount of hexamethyleneimine substantially free of water.

11. A process for the recovery of hexamethyleneimine from admixture with water which comprises bringing said mixture to a temperature below its boiling point but sufficiently elevated to cause a separation of said mixture into two layers, separating the upper layer and distilling said layer, thereby recovering as a distillate an azeotropic mixture of water and amine while leaving as a residue hexamethyleneimine.

12. A process for concentrating hexamethyleneimine which is in admixture with water which comprises bringing said mixture to a temperature below its boiling point but sufficiently elevated to cause a separation of said mixture into two layers and separating said layers.

13. A process for the separation of hexamethyleneimine from its azeotropic mixture with water by simple distillation which comprises bringing said azeotropic mixture to a temperature below its boiling point but sufficiently elevated to cause a separation of said mixture into two layers, separating the upper layer and distilling said upper layer thereby recovering as a distillate a second azeotropic mixture while leaving as a residue hexamethyleneimine.

14. A process for the separation of hexamethyleneimine from at least one other substance other than water which is produced by the catalytic hydrogenation of adiponitrile which comprises adding water to the mixture and then subjecting same to distillation.

MARK W. FARLOW.